DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1366

T889,017

USE OF QUINIZARIN AS AN IMAGE-FORMING DYE DEVELOPER

Judith M. Harbison, Kodak Park, Rochester, N.Y. 14650

Filed Sept. 25, 1970, Ser. No. 75,787
Int. Cl. G03c *1/40, 5/54*
U.S. Cl. 96—29
No Drawing. 15 Pages Specification

Photographic elements are disclosed comprising a silver halide emulsion having associated therewith as an image-forming dye developer, a quinizarin, preferably having the formula:

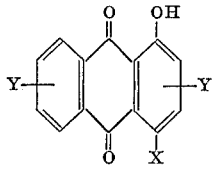

wherein X is hydroxyl or amino and Y is hydrogen, hydroxyl, amino, substituted amino, substituted or unsubstituted lower alkyl or alkoxy containing 1 to 5 carbon atoms, cyano, chloro, bromo or iodo. In a diffusion transfer system, a diffusible dye is formed after treating the exposed silver halide with an alkaline processing solution. The diffusible dye diffuses to a dye image-receiving layer to provide a positive dye image. The dye image-receiving layer may be located integral with the photosensitive element or may be located on a separate support adapted to be superposed on the photosensitive element after exposure thereof.